United States Patent
Sweeney et al.

(10) Patent No.: US 10,186,156 B2
(45) Date of Patent: Jan. 22, 2019

(54) DEPLOYING HUMAN-DRIVEN VEHICLES FOR AUTONOMOUS VEHICLE ROUTING AND LOCALIZATION MAP UPDATING

(71) Applicant: Uber Technologies, Inc., San Francisco, CA (US)

(72) Inventors: Matthew Sweeney, Pittsburgh, PA (US); Anthony Levandowski, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 30 days.

(21) Appl. No.: 15/604,979

(22) Filed: May 25, 2017

(65) Prior Publication Data

US 2018/0342165 A1  Nov. 29, 2018

(51) Int. Cl.
| | |
|---|---|
| *G08G 1/02* | (2006.01) |
| *G06Q 10/06* | (2012.01) |
| *G05D 1/02* | (2006.01) |
| *G08G 1/00* | (2006.01) |

(52) U.S. Cl.
CPC ....... *G08G 1/202* (2013.01); *G06Q 10/06311* (2013.01); *G05D 1/0231* (2013.01); *G05D 1/0274* (2013.01)

(58) Field of Classification Search
CPC ............ G08G 1/202; G06Q 10/06311; G05D 1/0231; G05D 1/0274
See application file for complete search history.

(56) References Cited

U.S. PATENT DOCUMENTS

| | | | |
|---|---|---|---|
| 8,527,445 B2* | 9/2013 | Karins ................ | G06N 7/005 706/16 |
| 9,940,729 B1* | 4/2018 | Kwant ................ | G06T 7/0042 |
| 2014/0136414 A1* | 5/2014 | Abhyanker ............ | G06Q 50/28 705/44 |
| 2014/0277900 A1* | 9/2014 | Abhyanker ............ | G01C 21/32 701/25 |
| 2015/0176997 A1* | 6/2015 | Pursche ............... | G08G 1/0967 340/905 |
| 2016/0182707 A1* | 6/2016 | Gabel ................. | H04W 4/90 455/404.2 |
| 2016/0370194 A1* | 12/2016 | Colijn ................ | G01C 21/343 |
| 2017/0120904 A1* | 5/2017 | Kentley ............... | G01C 21/32 |
| 2017/0123428 A1* | 5/2017 | Levinson ............. | G05D 1/0214 |
| 2017/0132934 A1* | 5/2017 | Kentley ............... | G08G 1/202 |
| 2018/0045536 A1* | 2/2018 | Kummerle ............ | G01C 3/00 |
| 2018/0136644 A1* | 5/2018 | Levinson ............. | G05D 1/0027 |
| 2018/0137373 A1* | 5/2018 | Rasmusson, Jr. .. | G01C 21/3638 |

FOREIGN PATENT DOCUMENTS

WO    WO-2016126321 A1 *  8/2016  ...... B60W 30/18154

* cited by examiner

*Primary Examiner* — Tyler J Lee
(74) *Attorney, Agent, or Firm* — Mahamedi IP Law LLP

(57) ABSTRACT

An on-demand transport system can manage an on-demand transportation service for a given region by matching requesting users with drivers and the AVs, where the AVs utilize localization maps and live sensor data to autonomously operate throughout the given region. The transport system can identify a local anomaly within the given region that affects AV performance. The transport system can transmit a routing invitation a driver to provide feedback corresponding to the local anomaly. Based on feedback data received from the driver, the transport system can transmit an update to AVs intersecting the local anomaly to enable the intersecting AVs to resolve the local anomaly.

20 Claims, 7 Drawing Sheets

DEPLOYING HUMAN-DRIVEN VEHICLES FOR AUTONOMOUS VEHICLE ROUTING AND LOCALIZATION MAP UPDATING

BACKGROUND

Precision, highly detailed mapping offers many advantages in autonomous vehicle (AV) operations. This can involve recording, processing, and labeling ground truth data (e.g., image and/or LIDAR data), and providing the resultant localization maps for on-board storage for dynamic comparison by the AV's processing systems with a live sensor view of the AV's surroundings. Such detailed mapping can be time, labor, and cost intensive, and can further act as a limiting factor in the eventual ubiquity of AV operations on public roads and highways.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
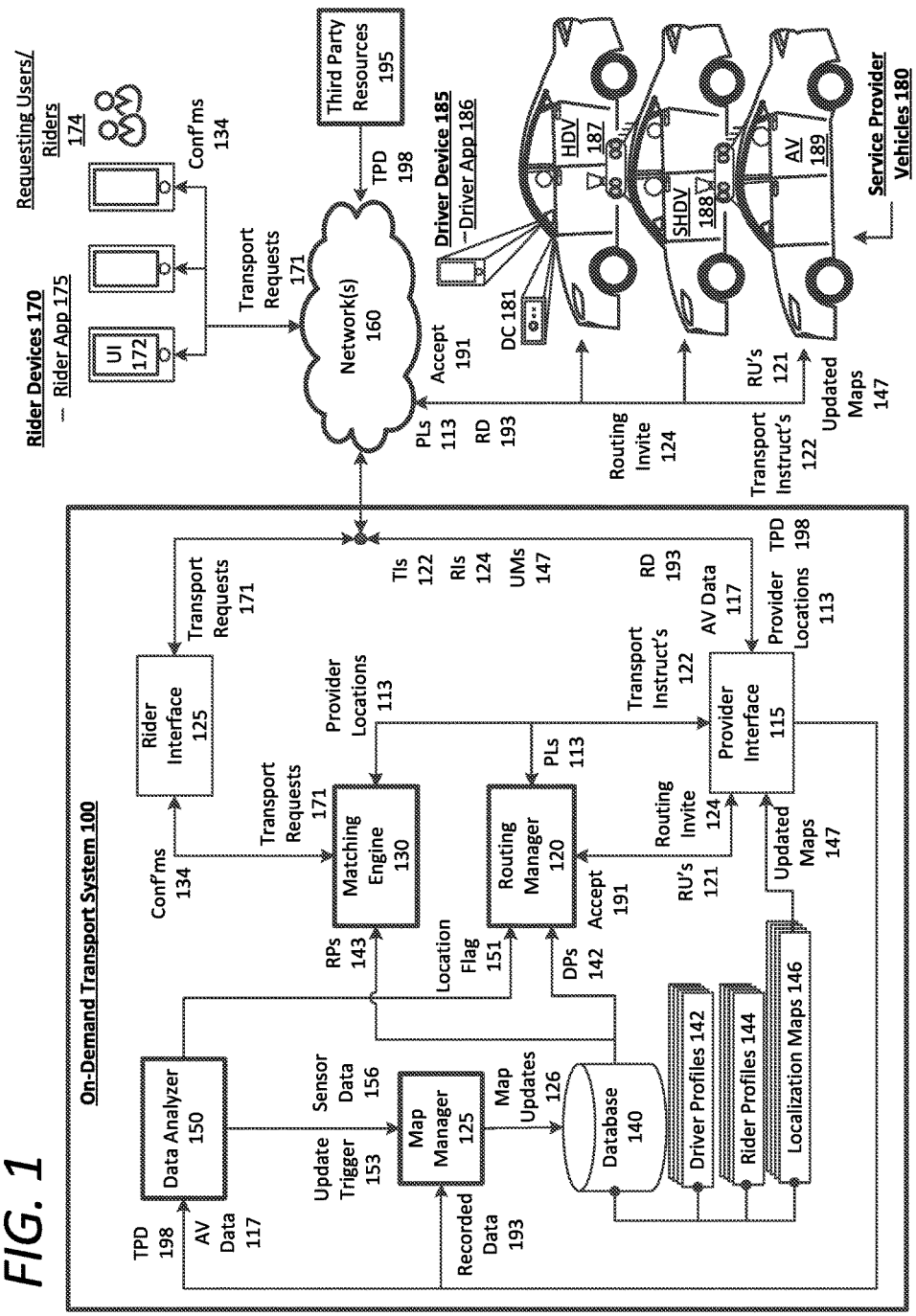
FIG. 1 is a block diagram illustrating an example on-demand transport facilitation system, according to examples described herein.

An on-demand transport facilitation system is described herein that manages on-demand transportation services linking available drivers and/or autonomous vehicles (AVs) with requesting riders throughout a given region (e.g., a metroplex such as the greater Pittsburgh, Pa. metropolitan area). In doing so, the transport facilitation system (or "transport system") can receive user requests for transportation from requesting users via a designated rider application executing on the users' computing devices. The transport system can receive a pick-up request and identify a number of proximate available vehicles relative to the user. The transport system may then select an available driver or AV to service the pick-up request based on a determined or inputted pick-up location by the requesting user.

In operating throughout the given region, the AVs can utilize highly detailed localization maps to dynamically compare with ground truth sensor data (e.g., live LIDAR and image data) in order to perform perception, prediction, and vehicle control operations along a given route. In doing so, the AVs can identify and classify objects of interest along the route (e.g., other vehicles, pedestrians, bicyclists, road signs, traffic signals, crosswalks, etc.), calculate risk or collision probabilities, and dynamically modulate braking, steering, and acceleration inputs for low level vehicle control along a high level route plan. In connection with the on-demand transport system, the AVs can receive transport directives or instructions identifying a pick-up location to rendezvous with a requesting user, and a drop-off location for the requesting user. Thus, the AVs can operate according to sequential destinations (e.g., pick-up and drop-off locations) received from the on-demand transport system.

According to various examples, the on-demand transport system can receive AV data from the AVs. The AV data can comprise log data or telemetry data that identifies hazard events, such as hard braking, swerving or other hasty maneuvering, proximity alerts, and the like. The AV data can further comprise real-time velocity information, accelerometer data, diagnostics information, etc., which can indicate certain locations that affect AV performance. In addition, the AV data can include teleassistance data—comprising teleassistance inquiries in which the AV requests remote assistance from the transport system given a stuck or high-caution state (e.g., due to new static objects being detected, an occlusion, a road hazard, etc.). Still further, the AV data can include routing data, indicating road segments being avoided by the AVs (e.g., due to road construction or closure). Additionally or alternatively, the on-demand transport system can access a third party, road project or planning resource (e.g., a city or county website) to preemptively identify locations and road segments throughout the given region that may affect the AVs' dynamic sensor data and localization map processing.

Based on the AV data and/or third party resource data, the on-demand transport system can preemptively or reactively identify a realized or potential local anomaly that can affect the manner in which the AVs operate. For example, a localization map anomaly can cause AVs to request assistance, enter a stuck state, or operate abnormally through a particular road segment in a high-caution state. Equally, frequent occurrences of the foregoing can signify staleness in one or more of the localization maps stored on-board by the AVs or accessed remotely. In variations, a time threshold may determine whether a particular localization map is stale or has a higher propensity towards staleness (e.g., ten days). Accordingly, examples described herein recognize that the involvement of significant labor and resources are required in order to initially record, process, stitch together, label, and distribute finalized localization maps to all operational AVs in a given regions. Likewise, similar labor and resource intensiveness is required to record, process, and finalize new localization maps for disbursement to the AVs.

Thus, it is contemplated herein to leverage the application platform and human-driver network of the on-demand transport system to heuristically resolve such local anomalies—anticipated or extrapolated from AV data. According to various implementations, the on-demand transport system can pinpoint the local anomaly, identify a candidate set of human drivers within a certain proximity of the anomaly, and deploy a human driver by transmitting a routing invitation to a selected driver to discern the source of the anomaly (if any), and transmit status or update data back to the on-demand transport system. In certain aspects, status data from the driver can comprise a delivered query and response from a computing device of the driver (e.g., via an executing driver application) determining whether the anomaly source should be avoided or ignored by the AVs. In response, the on-demand transport system can actively shut down the corresponding road segment to AV traffic, instruct the AVs to ignore the source, or instruct the AVs to handle or otherwise resolve the source in a particular manner respectively.

In variations or additionally, the driver can provide recorded data to the on-demand transport system to enable backend processing and resolution by the on-demand transport system. For example, the routing invitation can instruct the driver to record the particular road segment corresponding to the map anomaly with a recording device, such as the driver's mobile smartphone, a dashboard camera, or a specialized sensor package possessed by the driver (e.g., including stereoscopic cameras and/or LIDAR equipment). Along these lines, the on-demand transport system can store a driver profile for each driver indicating the driver's sensor resources in possession or mounted to the driver's vehicle. Depending on the nature and/or seriousness of the anomaly, the on-demand transport system can select a particular driver from the candidate set based on the sensor resources owned or possessed by the driver—or mounted on the driver's vehicle—in addition to the driver's distance or time from the concerning road segment.

Based on the query response and/or recorded data received from the driver, the on-demand transport system can at least partially resolve the localization map anomaly. In some aspects, the transport system can incorporate relevant portions of the recorded data to update a localization map, and then distribute the patched or updated localization map to the AVs accordingly. Additionally or alternatively, the transport system can provide an instruction to all AVs in the given region, or only those AVs having a likelihood of converging towards or intersecting with the problem area or location, to resolve or otherwise handle the anomaly in a particular manner. This instruction can comprise a command or recommendation to ignore the anomaly, avoid the anomaly, traverse through or past the anomaly in a certain state (e.g., a high-caution state), or hand over control of the AV to an on-board safety driver. In the above manner, certain anomalies associated with stale map data or changing real-world environments may be at least partially resolved without the need to expend considerable resources rerecording and processing such areas.

As provided herein, a "location anomaly," "local anomaly," or "localization map anomaly" can correspond to a location or road segment at which AVs are experiencing or are projected to experience difficulty, data inconsistency, or other complications. Such anomalies can comprise an occlusion, an unidentifiable static object, a new static object, a large puddle in the road, road debris, potholes or road buckling, planned or current road construction zones and road closures, and the like. Thus, a local anomaly can correspond to a consistent irregularity or predicament experienced by the AVs at a particular location or area (e.g., unscheduled stoppages, emergency maneuvering or hard braking, remote assistance requests, abnormally slow progressions, etc.). Along these lines, a localization map anomaly can be indicated due to an inconsistency between ground truth data and on-board localization maps of the AVs.

Among other benefits, the examples described herein achieve a technical effect of mitigating localization map degradation without the need for continuous or near-continuous recording and processing of refreshed maps, which can consume crucial resources in the goal of advancing AV system technology and overall road safety. In leveraging existing driver networks through an already ubiquitous on-demand transportation service, stale data in the distributed localization maps utilized by AVs may be overcome through query responses and/or can at least partially be refreshed using recorded data by the drivers.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the term "autonomous vehicle" (AV) describes any vehicle operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as on highways. More advanced AVs, such as those described herein, can operate in a variety of traffic environments without any human assistance. Accordingly, an "AV control system" can process sensor data from the AV's sensor array, and modulate acceleration, steering, and braking inputs to safely drive the AV along a given route.

System Description

FIG. 1 is a block diagram illustrating an example on-demand transport facilitation system, according to examples described herein. The on-demand transport facilitation system 100 can communicate, over one or more networks 160, with requesting users or riders 174 throughout a given region where on-demand transportation services are provided. Specifically, each requesting user 174 can execute a rider application 175 on the user's 174 computing device 170. As provided herein, the rider's computing device 170 can comprise a mobile computing device, personal computer, tablet computing device, virtual reality (VR) or augmented reality (AR) headset, and the like. Execution of the rider application 175 can cause the rider device 170 to establish a connection over the one or more networks 160 with a rider interface 125 of the on-demand transport facilitation system 100.

In various aspects, the executing rider application 175 can cause a user interface 172 to be generated on a display screen of the rider device 170. Using the user interface 172, the requesting user 174 can generate and transmit a transport request 171 to the rider interface 125. In various examples, the on-demand transport facilitation system 100 can further include a matching engine 130 that ultimately selects either a driver of human-driven vehicle 187, a specialized human-driven vehicle 188, or an AV 189 (which can include or exclude a safety driver) to service the transport request 171.

According to examples, the on-demand transport facilitation system 100 can include a provider interface 115 that connects, via the one or more networks 160, with a fleet of transportation service provider vehicles 180 available to provide on-demand transportation services to the requesting users 174. In various examples, the service provider vehicles 180 can comprise a fleet of AVs, any number of drivers, and/or a blend of human-driven vehicles and AVs servicing a given region. In certain aspects, the human-driven vehicles 187, 188 can also operate to provide transportation services at will, where the driver can execute a driver application 186 on a driver device 185 (e.g., a mobile computing device, smart phone, tablet computing device, etc.), causing the driver device 185 to transmit location data 113 indicating the driver's location to the provider interface 115. The executing driver application 186 can enable the driver of the vehicle 187, 188 to receive transport instructions 122 indicating a pick-up location to rendezvous with a matched requesting user 174 to service a given transport request 171.

Likewise, any given AV 189 in the fleet can transmit its current location 113 to the provider interface 115 of the on-demand transport facilitation system 100. The provider locations 113 can include the dynamic locations of each AV 189 and human-driven vehicle 187, 188 of the available service provider vehicles 180 throughout the given region. As provided herein, the provider interface 115 can transmit the provider locations 115 to a matching engine 130 of the transport system 100.

The matching engine 130 can receive the transport requests 171 from the rider interface 125, which can include respective pickup locations of the requesting users 174. Based on the provider locations 113, and using map data and/or traffic data, the matching engine 130 can identify a set of candidate vehicles to service the transport request 171. In doing so, the selection engine 130 can identify vehicles proximate to the pickup location indicated in the transport request 171, and determine the set of candidate vehicles based on the vehicles being a predetermined distance or time from the pickup location.

In various implementations, the on-demand transport system 100 can include a database 140 that includes driver profiles 142, rider profiles 144, and current localization maps 146 for the given region. These localization maps 146 can correspond to the on-board localization maps utilized by the AVs 189 to operate throughout the given region. For example, when new localization maps 146 are periodically recorded and processed, they may be distributed to the AVs 186 to refresh the old maps. In matching the requesting user 174 with a particular driver or AV 189, the matching engine 130 perform a lookup of the rider profile 143 associated with the requesting user 174 and transport request 171 to determine any personal preferences, special requests, ratings data for previous rides, or requirements. In some aspects, such data in the rider profile 143 can act as a filter for the matching engine 130 in ultimately selection an optimal service provider from the candidate set.

Upon identifying an optimal vehicle (e.g., a nearest vehicle to the pick-up location), the matching engine 130 can generate and transmit a transport instruction 122 to the selected vehicle to service the transport request 171. If the selected vehicle is a human driven vehicle 187, 188, the transport instruction 122 can comprise an invitation to service the transport request 171, and can be received by the driver's computing device 185 via the executing driver application 186. Once received the driver may either accept or decline the invitation. If the selected vehicle is an AV 189, then the AV 189 can respond to the transport instructions 122 by determining a route plan to the pick-up location and proceeding to rendezvous with the requesting user 174.

As the AVs 189 operate throughout the given region, the AVs 189 can generally provide AV data 117 to a data analyzer 150 of the transport system 100. In variations, the data analyzer 150 can receive or otherwise access the AV data 117 from each of the AVs 189 when the AVs 189 are not operational (e.g., at the end of the day or during fueling or recharging). As described herein, the AV data 117 can include sensor data from the AV's 189 sensor suite (e.g., LIDAR data, image data, telemetry data, etc.). In addition, the AV data 117 can include assistance request data in which the AV 189 requests backend assistance due to a stuck state, which can indicate confusion, a risk threshold being exceeded, or a different anomaly encountered during autonomous driving. According to examples provided herein, the data analyzer 150 can analyze the AV data 117 from several or all AVs 189 operating throughout the given region. Through analysis of the AV data 117, the data analyzer 150 can identify problem locations in which the AVs 189 are running into issues.

In certain examples, the AV data 117 can comprise image or LIDAR data indicating a local anomaly (e.g., an occlusion, an unidentifiable object, a new static object, a large puddle in the road, road debris, potholes or road buckling, road construction zones, road closures, and the like). These data may be processed by the data analyzer 150 to identify a source or cause of the location anomaly. Additionally, in certain implementations, the image and/or LIDAR data (i.e., sensor data 156) comprised in the AV data 117 can be utilized by the data analyzer 150 to update a corresponding localization map 146 in the database 140. For example, when a local anomaly is identified by the data analyzer 150 in the AV data 117, the data analyzer 150 can transmit the sensor data 156 (e.g., image and/or LIDAR data from one or more AVs 189) to a map manager 125 of the on-demand transport system 100. Using the sensor data 156, the map manager 125 can generate a map update 126 for the concerning localization map 146. Thereafter, the updated localization map 147 can be distributed to the AVs 189 operating throughout the given region.

In generating a map update 126, the map manager 125 can identify the local anomaly in the sensor data 156—or, as described below, update data 193 provided by drivers. The local anomaly can correspond to a source or cause of a problem affecting the AVs 189. This can comprise a new road sign or other static object (e.g., a new structure, such as a building), a road construction zone or road closure, an unidentifiable object (e.g., a pothole or road debris), and the like. In various aspects, using the sensor data 156 and/or update data 193, the map manager 125 can patch or otherwise update an existing localization map 146 to include the new data identifying the local anomaly so that the AVs 189 are not caught off guard. In other words, the map manager 125 can refresh the existing localization map 146 with a stitched, local update, and the provider interface 115 can distribute the updated localization map 147 to the AVs 189 accordingly.

In general, the data analyzer 150 can process the AV data 117 to identify the existence of local anomalies, before determining a cause for each anomaly. In one example, the data analyzer 150 can identify locations in which the AVs 189 are consistently stopping or slowing when traffic data otherwise indicates that the corresponding road segment should be clear. As another example, the AVs 189 may be consistently transmitting teleassistance requests due to a particular local anomaly. In further examples, the AV data 117 can indicate close calls, emergency maneuvers (e.g., swerves or hard braking), or other hazardous events occurring in a single area or location. In still other examples, the drivers operating the driver vehicles 187, 188 can identify and report anomalous scenarios or locations when encountered to aid in maintaining traffic flow or preemptively mitigate future problems potentially encountered by the AVs 189.

Additionally, the on-demand transport system 100 can proactively identify sources of local anomalies by accessing a number of third party resources 195 providing third party data 198 indicating future road or traffic events. For example, the third party resources 195 can include a city planning resource (e.g., a website) that provides upcoming road projects and closures. In certain variations, the third party data 198 can include event schedules indicating respective times and locations of events, such as running or bicycle races, parades, protests, festivals, concerts, and the like. For a given event, based on the event's characteristics (e.g., size, estimated traffic impact, etc.), the data analyzer 150 can generate a location flag 151 for a routing manager 120 of the on-demand transport system 100. The location flag 151 can indicate the future impacted location or area, and the routing manager 120 can provide route updates 121 to the AVs 189 to preemptively address the potential future impact on AV operation. For example, prior to a particular event, the routing manager 120 can route the AVs 189 to avoid the location or area indicated by the location flag 151.

In still further examples, the third party data 198 can comprise construction project schedules (e.g., through a city planning and/or project approval resource or website) which can indicate new and upcoming static objects, buildings, and structures that will require new mapping. In certain implementations, the data analyzer 150 can process such data 195 in order to plan or monitor the locations and areas corresponding new construction projects. For example, the AV data 117 can include image data and location data from the AVs 189, which the data analyzer 150 can analyze to monitor the progress of a construction site at a specific location. In this example, once the corresponding localization map 146—associated with a road segment at which the construction site is located—degrades beyond a certain threshold due to the construction project (e.g., 30% degradation due to the addition of new static objects), the data analyzer 150 can generate an update trigger 153 for the localization map 146, and a location flag 151 for the corresponding road segment. Thereafter, the routing manager 120 can send out routing invitations 124 to deploy one or more human drivers in order to instigate sensor data recording of the road segment by human drivers, and the map manager 125 can provide map updates 126 to the stale localization map 146 using the recorded data 193 accordingly (e.g., new data in the recorded data 193 indicating a new static object). Once the stale localization map 146 is updated, the updated map 147 can be distributed to the AVs 189.

In certain examples, the third party data 198 can comprise live weather data, which the data analyzer 150 can process to predict problems with AV performance in certain areas. For example, AVs 189 can typically have trouble operating when there is precipitation. Accordingly, when the data analyzer 150 detects local precipitation in a certain portion of the given region, it can trigger the routing manager 120 to transmit route updates 121 that reroute the AVs 189 to avoid the area(s) of local precipitation.

According to examples described herein, upon detecting a local anomaly (either from the AV data 117 or the third party data 198), the data analyzer 150 can determine that additional information or human assistance may be beneficial or necessary to provide further context regarding the local anomaly, feedback regarding safety or traversability of a given road segment, and/or recorded sensor data (e.g., image data) to identify the source of the local anomaly for map editing purposes. In such examples, the data analyzer 150 can transmit a location flag 151 to the routing manager 120 indicating the location of the local anomaly. In certain aspects, the context of the local anomaly can further indicate an appropriate response in leveraging driver involvement.

For example, in accordance with a tasking framework, the data analyzer 150 can determine whether a localization map 146 requires updating, whether the anomaly can be addressed through an inquiry and response with one or more drivers, and/or whether additional sensor data recordings are needed to update the localization maps 146. For example, the data analyzer 150 can perform map subtraction of dynamic objects in the AV data 117 (e.g., other vehicles, pedestrians, bicyclists, etc.) to determine whether a given localization map 146 differs from static ground truth data by a predetermined threshold (e.g., 25%). If so, the data analyzer 150 can utilize driver assistance in updating the stale localization map 146. When deployment of one or more drivers are needed to resolve a local anomaly, the routing manager 120 can generate and transmit a routing invitation 124 to one or more drivers in the vicinity of the local anomaly to examine the location. As provided herein, the routing invitation 124 can indicate the local anomaly and can include an incentive (e.g., a payment or fare increase) for the driver. Upon receiving the routing invitation 124 on the driver's computing device 185 (e.g., via the executing driver application 186), the driver may either accept or decline the invitation 124. If the driver provides an input accepting the invitation 124, then data indicating the acceptance 191 can be transmitted back to the routing manager 120.

In certain implementations, the routing manager 120 can provide status queries to the driver device 185 to determine the nature of the local anomaly, as described in detail below. Such status queries can be binary, such as asking the driver whether a certain road segment is passable, or can task the driver to perform one or more actions or responses. For example, a status query can provide an interactive map to the driver, and ask the driver to indicate or draw a box around an affected area or road segment. In another example, the status query may ask the driver to capture an image or video of the affected area or road segment with the driver device 185, and transmit recorded data 193 back to the transport system 100 for further analysis.

In further implementations, the routing invitation 124 can include instructions to record sensor data at the location corresponding to the local anomaly. In some aspects, the sensor recording resources of the drivers can be indicated in the stored driver profiles 142. Accordingly, the data analyzer 150 and routing manager 120 can coordinate to determine the type of resolution need for the given local anomaly. As described herein, if the AV data 117 indicates a new static object or scenario that requires a map update 126, then the routing manager 120 can prioritize specialized human-driven vehicles 188 having special recording equipment (e.g., roof-top LIDAR data and/or image data recorders).

Accordingly, given the nature of the local anomaly, the routing manager 120 can filter out candidate drivers based on their recording equipment. The routing manager 120 can do so by accessing the driver profiles 142 of a set of candidate drivers within a predetermined distance or time from the local anomaly, identifying their sensor data recording resources, and filtering accordingly. As provided herein, the sensor data recording resources of the drivers can include image capturing resources of the driver's computing device 185, a video recording device, such as a dashboard camera 181, or specialized recording equipment, such as LIDAR sensors or stereoscopic cameras. According to one example, in identifying a local anomaly that requires a map update 126, the data analyzer 150 can transmit an update trigger 153 to the map manager 125 to pull the stale localization map for updating. In conjunction, the routing manager 120 can select a driver of a specialized vehicle 188 including sensors and recording devices, and transmit a routing invitation 124 to that driver.

The driver can then drive to the local anomaly, record a road segment corresponding to the local anomaly, and transmit recorded data 193 of the local anomaly back to the on-demand transport system 100. The recorded data 193 can be analyzed and processed by the map manager 125 to provide a map update 126 to the stale localization map 146. This updated localization map 147 may then be distributed to the AVs 189 accordingly.

In further examples, the data analyzer 150 may determine that a particular local anomaly is better avoided than resolved, such as complicated road construction areas or dangerous occlusions. In such examples, the routing manager 120 and the matching engine 130 can provide transport instructions 122 and routing updates 121 to route the AVs 189 in a manner such that these local anomalies are avoided. In this manner, the on-demand transport system 100 can actively shut down certain portions or road segments of the given region to AVs 189. In further examples, given a particular local anomaly, the on-demand transport system 100 can further provide transport instructions 122 that change traffic rules for the AVs 189 for increased caution and safety.

Examples described herein can further leverage the driver network of the on-demand transport system 100 to probe new, unmapped areas and/or perform data gardening techniques on the current set of localization maps 146. In doing so, the map manager 125 can monitor a degradation level or age of each localization map 146, and request a refresh when a specified map gets too degraded or old. The routing manager 120 can then identify a set of candidate drivers based on, for example, the drivers' sensor resources as indicated in the driver profiles 142, and transmit respective routing invitations 124 to perform data gardening operations accordingly.

Autonomous Vehicle

Figure 2:
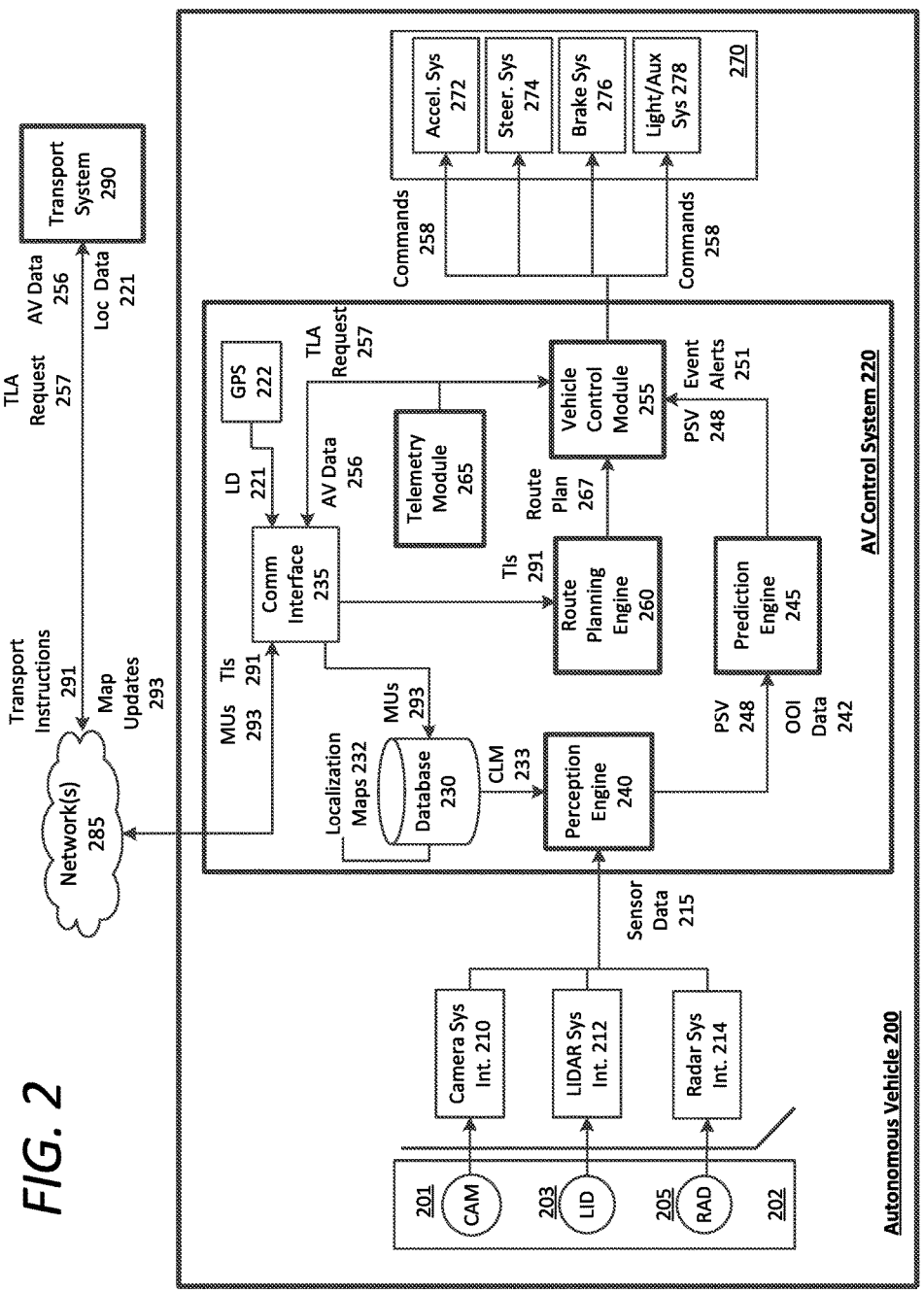
FIG. 2 is a block diagram illustrating an example autonomous vehicle in communication with an on-demand transport facilitation system, as described herein.

FIG. 2 is a block diagram illustrating an example autonomous vehicle in communication with an on-demand transport facilitation system, as described herein. In an example of FIG. 2, a control system 220 can autonomously operate the AV 200 in a given geographic region for a variety of purposes, including transport services (e.g., transport of humans, delivery services, etc.). In examples described, the AV 200 can operate without human control. For example, the AV 200 can autonomously steer, accelerate, shift, brake, and operate lighting components. Some variations also recognize that the AV 200 can switch between an autonomous mode, in which the AV control system 220 autonomously operates the AV 200, and a manual mode in which a driver takes over manual control of the acceleration system 272, steering system 274, braking system 276, and lighting and auxiliary systems 278 (e.g., directional signals and headlights).

According to some examples, the control system 220 can utilize specific sensor resources in order to autonomously operate the AV 200 in a variety of driving environments and conditions. For example, the control system 220 can operate the AV 200 by autonomously operating the steering, acceleration, and braking systems 272, 274, 276 of the AV 200 to a specified destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes computational resources (e.g., processing cores and/or field programmable gate arrays (FPGAs)) which operate to process sensor data 215 received from a sensor system 202 of the AV 200 that provides a sensor view of a road segment upon which the AV 200 operates. The sensor data 215 can be used to determine actions which are to be performed by the AV 200 in order for the AV 200 to continue on a route to the destination, or in accordance with a set of transport instructions 291 received from an on-demand transport facilitation system 290, such as the on-demand transport facilitation system 100 described with respect to FIG. 1. In some variations, the control system 220 can include other functionality, such as wireless communication capabilities using a communication interface 235, to send and/or receive wireless communications over one or more networks 285 with one or more remote sources. In controlling the AV 200, the control system 220 can generate commands 258 to control the various control mechanisms 270 of the AV 200, including the vehicle's acceleration system 272, steering system 257, braking system 276, and auxiliary systems 278 (e.g., lights and directional signals).

The AV 200 can be equipped with multiple types of sensors 202 which can combine to provide a computerized perception, or sensor view, of the space and the physical environment surrounding the AV 200. Likewise, the control system 220 can operate within the AV 200 to receive sensor data 215 from the sensor suite 202 and to control the various control mechanisms 270 in order to autonomously operate the AV 200. For example, the control system 220 can analyze the sensor data 215 to generate low level commands 258 executable by the acceleration system 272, steering system 257, and braking system 276 of the AV 200. Execution of the commands 258 by the control mechanisms 270 can result in throttle inputs, braking inputs, and steering inputs that collectively cause the AV 200 to operate along sequential road segments according to a route plan 267.

In more detail, the sensor suite 202 operates to collectively obtain a live sensor view for the AV 200 (e.g., in a forward operational direction, or providing a 360 degree sensor view), and to further obtain situational information proximate to the AV 200, including any potential hazards or obstacles. By way of example, the sensors 202 can include multiple sets of camera systems 201 (video cameras, stereoscopic cameras or depth perception cameras, long range monocular cameras), LIDAR systems 203, one or more radar systems 205, and various other sensor resources such as sonar, proximity sensors, infrared sensors, and the like. According to examples provided herein, the sensors 202 can be arranged or grouped in a sensor system or array (e.g., in a sensor pod mounted to the roof of the AV 200) comprising any number of LIDAR, radar, monocular camera, stereoscopic camera, sonar, infrared, or other active or passive sensor systems.

Each of the sensors 202 can communicate with the control system 220 utilizing a corresponding sensor interface 210, 212, 214. Each of the sensor interfaces 210, 212, 214 can include, for example, hardware and/or other logical components which are coupled or otherwise provided with the respective sensor. For example, the sensors 202 can include a video camera and/or stereoscopic camera system 201 which continually generates image data of the physical environment of the AV 200. The camera system 201 can provide the image data for the control system 220 via a camera system interface 210. Likewise, the LIDAR system 203 can provide LIDAR data to the control system 220 via a LIDAR system interface 212. Furthermore, as provided herein, radar data from the radar system 205 of the AV 200 can be provided to the control system 220 via a radar system interface 214. In some examples, the sensor interfaces 210, 212, 214 can include dedicated processing resources, such as provided with field programmable gate arrays (FPGAs) which can, for example, receive and/or preprocess raw image data from the camera sensor.

In general, the sensor systems 202 collectively provide sensor data 215 to a perception engine 240 of the control system 220. The perception engine 240 can access a database 230 comprising stored localization maps 232 of the given region in which the AV 200 operates. The localization maps 232 can comprise a series of road segment sub-maps corresponding to the autonomy grid 142 described with respect to FIG. 1. As provided herein, the localization maps 232 can comprise highly detailed ground truth data of each road segment of the given region. For example, the localization maps 232 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 200 travels along a given route, the perception engine 240 can access a current localization map 233 of a current road segment to compare the details of the current localization map 233 with the sensor data 215 in order to detect and classify any objects of interest, such as moving vehicles, pedestrians, bicyclists, and the like.

In various examples, the perception engine 240 can dynamically compare the live sensor data 215 from the AV's sensor systems 202 to the current localization map 233 as the AV 200 travels through a corresponding road segment. The perception engine 240 can flag or otherwise identify any objects of interest in the live sensor data 215 that can indicate a potential hazard. In accordance with many examples, the perception engine 240 can provide object of interest data 242 to a prediction engine 245 of the control system 220, wherein the objects of interest in the object of interest data 242 indicates each classified object that can comprise a potential hazard (e.g., a pedestrian, bicyclist, unknown objects, other vehicles, etc.).

Based on the classification of the objects in the object of interest data 242, the prediction engine 245 can predict a path of each object of interest and determine whether the AV control system 220 should respond or react accordingly. For example, the prediction engine 240 can dynamically calculate a collision probability for each object of interest, and generate event alerts 251 if the collision probability exceeds a certain threshold. As described herein, such event alerts 251 can be processed by the vehicle control module 255, along with a processed sensor view 248 indicating the classified objects within the live sensor view of the AV 200. The vehicle control module 255 can then generate control commands 258 executable by the various control mechanisms 270 of the AV 200, such as the AV's acceleration, steering, and braking systems 272, 274, 276.

On a higher level, the AV control system 220 can include a route planning engine 260 that provides the vehicle control module 255 with a route plan 267 to a given destination, such as a pick-up location, a drop off location, or other destination within the given region. In various aspects, the route planning engine 260 can generate the route plan 267 based on transport instructions 291 received from the on-demand transport system 290 over one or more networks 285. According to examples described herein, the AV 200 can include a location-based resource, such as a GPS module 222, that provide location data 221 (e.g., periodic location pings) to the on-demand transport system 290. Based on the AV's 200 location data 221, the on-demand transport system 290 may select the AV 200 to service a particular transport request, as described above with respect to FIG. 1.

In certain scenarios, the perception engine 240, prediction engine 245, or vehicle control module 255 can run into issues in analyzing the processed sensor view 248, causing delays or a stuck state in which the AV 200 must stop and resolve the issue prior to proceeding. Such issues can correspond to the local anomalies described herein. In some aspects, the vehicle control module 255 can attempt to resolve the local anomaly by transmitting a teleassistance request 257 to the on-demand transport system 290. The on-demand transport system 290 can attempt to resolve the request, for example, by performing additional processing on the processed sensor view 248 or enabling a remote human operator to make a decision for the AV 200 (e.g., ignore, proceed with caution, reroute, etc.).

In general, the vehicle control module 255 can also provide AV data 256 to the on-demand transport system 290, such as select sensor data 215 or images from the processed sensor view 248. In various examples, the AV 200 can also include a telemetry module 265, which can include telemetry data with the AV data 256 transmitted to the transport system 290. The telemetry module 265 can include an inertial measurement unit or accelerometer, temperature sensors, fuel or energy level sensors, tire pressure sensors, and the like, and can include such corresponding data with the AV data 256 transmitted back to the transport system 290.

According to examples described herein, the transport system 290 can analyze the AV data 256 to determine whether a given local anomaly can be attributable to stale data in a localization map 232. If so, the transport system 290 can coordinate with human drivers to generate updates to the localization maps 232. The transport system 290 can then transmit a map update 293 to the AV 200, which the control system 220 can utilize to replace a stale localization map 232 in the database 230. For example, the transport system 290 can include metadata indicating the particular road segment associated with the map update 293, which the control system 220 can correlate to a stale map in the stored localization maps 232. Furthermore, as provided herein, the AV control system 220 can periodically receive map updates 293 to refresh old or degraded localization maps 232 in the database 230.

Driver Device

Figure 3:
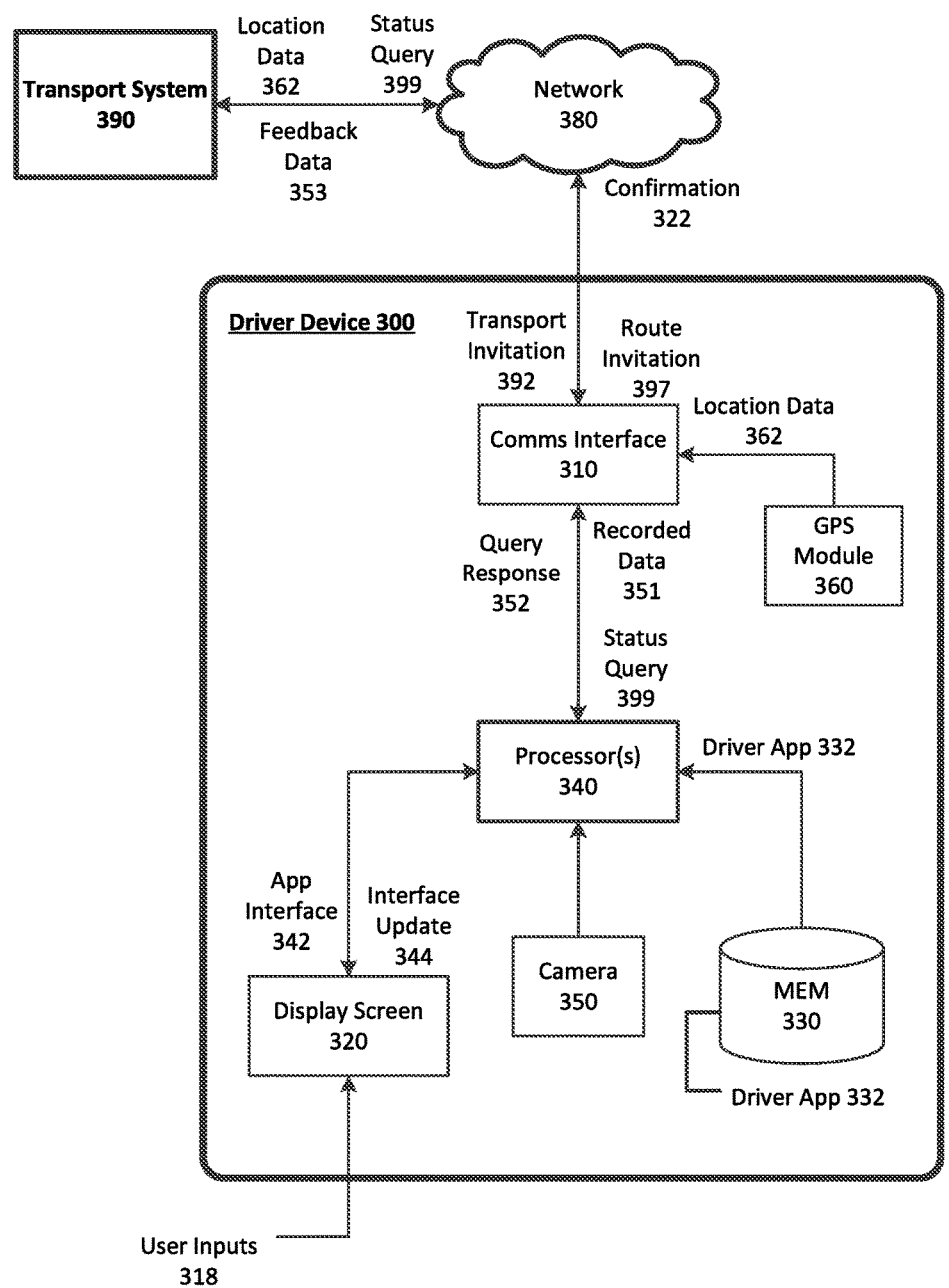
FIG. 3 is a block diagram illustrating an example driver device in connection with an on-demand transport facilitation system, as described herein.

FIG. 3 is a block diagram illustrating an example driver device in connection with an on-demand transport facilitation system, as described herein. In many implementations, the driver device 300 can comprise a mobile computing device, such as a smartphone, tablet computer, laptop computer, VR or AR headset device, and the like. As such, the driver device 300 can include typical telephony features such as a microphone 345, a camera 350, and a communication interface 310 to communicate with external entities using any type of wireless communication protocol. In certain aspects, the driver device 300 can store a designated application (e.g., a driver app 332) in a local memory 330.

In response to a user input 318, the driver app 332 can be executed by one or more processors 340, which can cause an app interface 342 to be generated on a display screen 320 of the driver device 300. The app interface 342 can enable the driver to initiate an "on-call" or "available" sub-state (of the normal application state), linking the driver device 300 to the on-demand transport system 390 that facilitates the on-demand transportation services. Execution of the driver application 332 can also cause a location resource (e.g., GPS module 360) to transmit location data 362 to the transport system 390 to indicate the current location of the driver with the given region.

In many aspects, the driver can receive transport invitations 392 from the transport system 390, where the transport invitations 392 indicate a particular pick-up location to service a pick-up request. The driver can provide confirmations 322 back to the transport system 390 indicating that the driver will service the pick-up request, or, in some aspects, decline the transport invitation 392 and await a subsequent opportunity. Upon submitting a confirmation 322, the driver application 332 can place the driver device 300 in an en route state while the driver drives to the pick-up location to rendezvous with the requesting user. Thereafter, the driver application 332 can initiate an on-trip sub-state (e.g., provide map directions to the requester's destination) while the driver transports the requesting user to the destination.

According to examples described herein, the transport system 390 may occasionally transmit a route invitation 397 to the driver device 300 to assist in resolving a local anomaly. In one aspect, the route invitation 297 can include an incentive, such as a dollar amount in payment, and can further identify a location corresponding to the local anomaly. The driver can provide a user input 318 either accepting or declining the route invitation 397. In some aspects, the route invitation 397 can be transmitted when the driver is already on-trip with a passenger to a destination, and can comprise a slight detour to the driver's current route. In such examples, the transport system 390 can coordinate agreement between the driver and passenger (i.e., requesting user 174 of FIG. 1) by querying to both whether a detour is amenable. Such queries can correspond to interface updates 344 that can indicate the detour and an estimated additional time. In one aspect, the query can offer a discount for the ride to the passenger and an additional bonus to the driver. If combined agreement is reached, then the transport system 390 can provide an updated route to the driver device 300 to enable the driver to perform the detour.

When the driver is not on-trip or en route to rendezvous with a requesting user, the driver alone may accept or decline a given route invitation 397. If accepted, the driver can drive to the location of the local anomaly indicated, and perform one or more actions. As described, the transport system 390 can monitor the location of the driver, and once the driver is near the local anomaly, can transmit a status query 399 to the driver device 300. The status query 399 can cause an interface update 344 on the app interface 342, which can comprise a simple binary query, such as "Is this road segment passable?" For such binary queries, the app interface 342 can generate a "Yes/No" selection interface, and the driver can make a subjective determination and selection accordingly to submit a query response 352 back to the transport system 390. The driver's selection can correspond to input data from the app interface 342, which can cause the processor 340 to transmit the query response 352 accordingly.

In various implementations, the status query 399 can include additional or alternative requests, such as a request to provide recorded image data 351 indicating a source or cause of the local anomaly using a camera 350 of the driver device 300. In some aspects, the transport system 390 can trigger the driver device 300 to initiate image data recording automatically based on the location data 362. For example, once the driver approaches a road segment corresponding to the local anomaly, the transport system 390 can transmit a recording signal to trigger the camera 350 to initiate image data recording. Furthermore, once the driver has passed through the road segment, the transport system 390 can cause automatic transmission of the recorded data 351 back to the transport system 390 (e.g., via the executing driver app 332).

In certain examples, the status query 399 can provide further questions or feedback requests to the driver, such as a sequence of queries in order to provide context to the local anomaly. In one aspect, the status query 399 can provide an interactive map (e.g., via an interface update 344) and can request that the driver provide inputs on the interactive map identifying the location or affected road segment(s). The driver device 300 may then transmit a query response 352, which may be processed by the transport system 390 in order to, for example, reroute AVs, provide localization map updates to AVs, instruct the AVs to proceed through the affected area(s) in a specified manner. Accordingly, in general, the recorded data 351 and/or query responses 352 can be transmitted back to the transport system 390 as feedback data 353 from the driver.

Methodology

Figure 4:
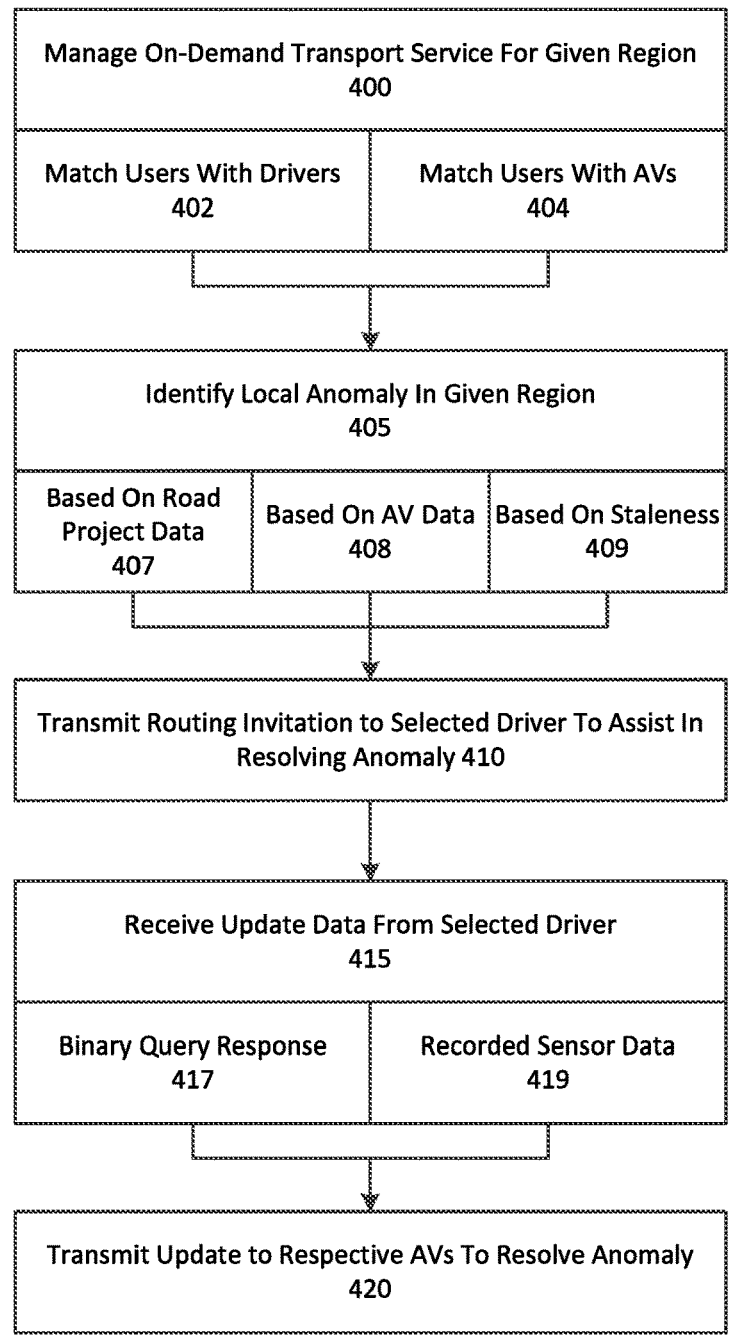
FIG. 4 is a flow chart describing an example method of updating localization maps for autonomous vehicles, according to examples described herein.

FIG. 4 is a flow chart describing an example method of updating localization maps for autonomous vehicles, according to examples described herein. In the below description of FIG. 4, reference may be made to reference characters representing like features as shown and described with respect to FIGS. 1-3. Furthermore, the below steps and processes described in connection with FIG. 4 may be performed by an example on-demand transport system 100, 290, 390 as shown and described with respect to FIGS. 1-3. Referring to FIG. 4, the transport system 100 can manage an on-demand transportation service for a given region (400). In doing so, the transport system 100 can receive transport requests 171 from requesting users 174 and match the users 174 with available drivers (402) operating throughout the given region. In addition, the transport system 100 can match requesting users 174 with available AVs 189 operating throughout the given region (404).

In various implementations, the transport system 100 can identify a local anomaly in the given region impacting AV performance (400). For example, the transport system 100 can identify or determine the local anomaly based on road project data from a city or county planning resource (407), AV data 117 received from affected AVs 189 (408), or based on staleness of the maps themselves, either through degradation or time (409). The transport system 100 may then transmit a routing invitation 124 to a selected driver to assist in resolving the localization map anomaly (410). For example, the transport system 100 can identify a set of candidate drivers within proximity to a location corresponding to the anomaly, and select one of the candidate drivers based on distance, time, and/or sensor data recording resources possessed by the driver.

Upon accepting the routing invitation 124, the driver may then drive to the indicated location to provide the transport system 100 with feedback. Accordingly, the transport system 100 can receive update data from the driver device 185 of the selected driver providing context to the anomaly (415). For example, the transport system 100 can receive a binary query response from the driver indicating whether the road segment corresponding to the anomaly is passable (417). In variations, the feedback can comprise recorded sensor data 193 from a recording device or system possessed by the driver, as described herein (419). Based on the driver feedback and/or recorded data 193 from the driver, the transport system 100 can transmit an update resolving the local anomaly to respective AVs 189 encountering or routed to intersect or converge with the local anomaly (420).

Figure 5:
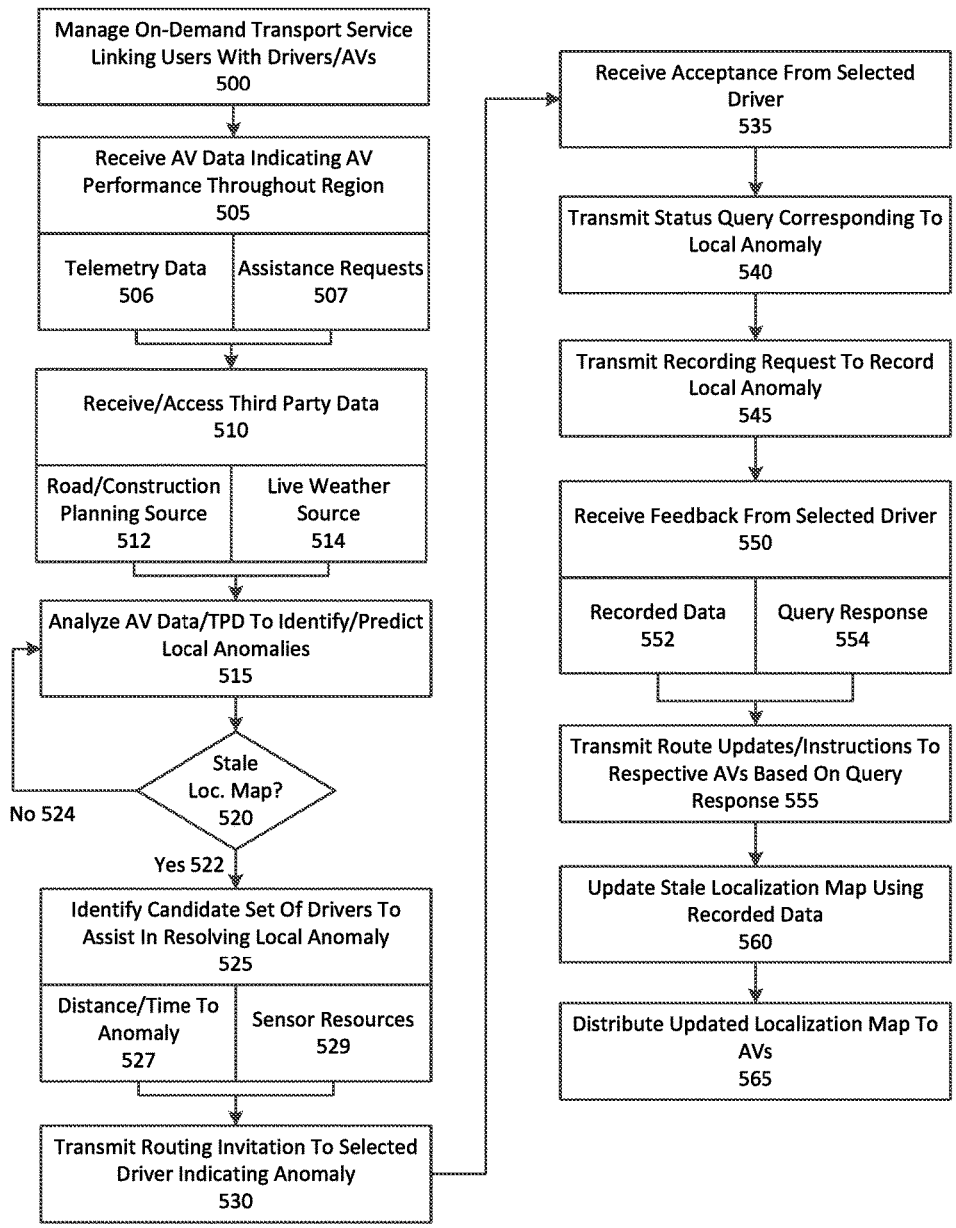
FIG. 5 is flow chart describing another example method of updating localization maps for autonomous vehicles, according to examples described herein.

FIG. 5 is flow chart describing another example method of updating localization maps for autonomous vehicles, according to examples described herein. In the below description of FIG. 5, reference may be made to reference characters representing like features as shown and described with respect to FIGS. 1-3. Furthermore, the processes and steps described in connection with FIG. 5 may also be performed by an example on-demand transport system 100, 290, 390 as shown and described with respect to FIGS. 1-3. Referring to FIG. 5, the transport system 100 can manage an on-demand transportation service that matches requesting users 174 with available human drivers and AVs 189 operating throughout a given region, as described herein (500). In various examples, the transport system 100 can receive AV data 117 from the AVs 189, where the AV data 117 generally indicates AV progress and performance throughout the given region (505). The AV data 117 can include telemetry data, such as real-time location and velocity data, accelerometer data (e.g., indicating hard braking or swerving), diagnostics information (e.g., tire pressure information, brake temperatures, engine temperature, battery temperature, etc.), fuel or energy level, and the like (506). The AV data 117 can further include teleassistance requests 257 received from the AVs 189, indicating stuck states in which a respective AV 189 is unable to continue due to, for example, a diagnostics failure, a detection failure, o, as described herein, a local anomaly (507).

In various examples, the transport system 100 may also receive third party data 198 from one or more third party resources 195 (510), such as a road construction or planning source (512), or a live weather source (512). The transport system 100 may dynamically analyze the collective AV data 117 and/or the third party data 198 to identify or predict local anomalies within the given region (515). In some aspects, the local anomaly may be due to characteristics that are dynamic in nature, such as an area being overcrowded with pedestrians, traffic jams, or a sudden rain shower. In such examples, the transport system 100 may reroute the AVs 189 to avoid such locations.

In variations, the local anomaly can be static in nature, which can indicate that the localization map 146 corresponding to the local anomaly may comprise stale data. Thus, the transport system 100 may determine that an update to the localization map 146 is required, or that recurring AV issues with the road segment corresponding to the local anomaly may be mitigated through operative commands (e.g., an "ignore anomaly" command, a "proceed with caution" or "reduce speed" command, or a detour command). Thus, according to examples described herein, the transport system 100 can determine whether the localization map 146 corresponding to the identified local anomaly comprises stale data (520). If not (524), then the transport system 100 may, for example, reroute AVs 189 to avoid the local anomaly and continue to analyze the AV data 117 and third party data 198 (515). However, if so (522), then transport system 100 can identify a candidate set of driver to assist in resolving the local anomaly (525).

In doing so, the transport system 100 can determine the set of candidate drivers based on road distance or time (e.g., given current traffic conditions) to the local anomaly (527). Additionally or alternatively, the transport system 100 can determine the set of candidate drivers based on the sensor resources possessed by the driver or included on the driver's vehicle, as indicated by the driver profiles 142 of the drivers (529). Upon selecting a particular driver, the transport system 100 can transmit a routing invitation 124 to the selected driver indicating the local anomaly (530). As described herein, the routing invitation 124 may include an incentive to accept, such as a payment offer or percentage increase in future fare. Thus, the transport system 100 may receive data indicating the acceptance 191 from the selected driver (535).

Upon receiving the acceptance 191 of the routing invitation 124, the transport system 100 can transmit a status query 399, corresponding to the local anomaly, to the driver device 300 of the selected driver (540). In certain implementations, the status query 399 may be binary in nature (e.g., querying a "yes/no" answer). In variations, the status query 399 may involve multiple queries to gain context with regard to the local anomaly. Additionally or alternatively, the transport system 100 can transport a recording request to the driver device 300, requesting that the driver record sensor data identifying a source or cause of the local anomaly (545).

Thereafter, the driver can drive to the location of the local anomaly and provide the requested feedback accordingly. Thus, the transport system 100 can receive feedback from the selected driver (550). The feedback can comprise recorded data 351 identifying the source of the local anomaly (e.g., a new static object, a road closure or construction zone, road debris, a puddle, a pothole, etc.) (554). In variations or as an addition, the feedback can comprise a query response to the status query 399 (e.g., indicating that the road segment is passable, classifying an indeterminate object, etc.) (554). In response to the feedback, the transport system 100 can transmit route updates 121 or operative instructions to respective AVs 189 having routes intersecting with the local anomaly (555). Such updates 121 and/or instructions can cause the AVs 189 to either avoid the local anomaly entirely, or proceed to resolve the anomaly in a certain manner (e.g., ignore, wait, proceed slowly, etc.).

In various implementations, the transport system 100 may update the stale localization map 146 with the recorded data 351 from the driver (560). As described herein, the transport system 100 can do so by extracting the new data (e.g., image or LIDAR data including a new static object) and overlaying or otherwise patching the existing stale localization map 146 with the new data. Thereafter, the transport system 100 can distribute the refreshed, updated localization map 147 to the AVs 189 (565).

Hardware Diagrams

Figure 6:
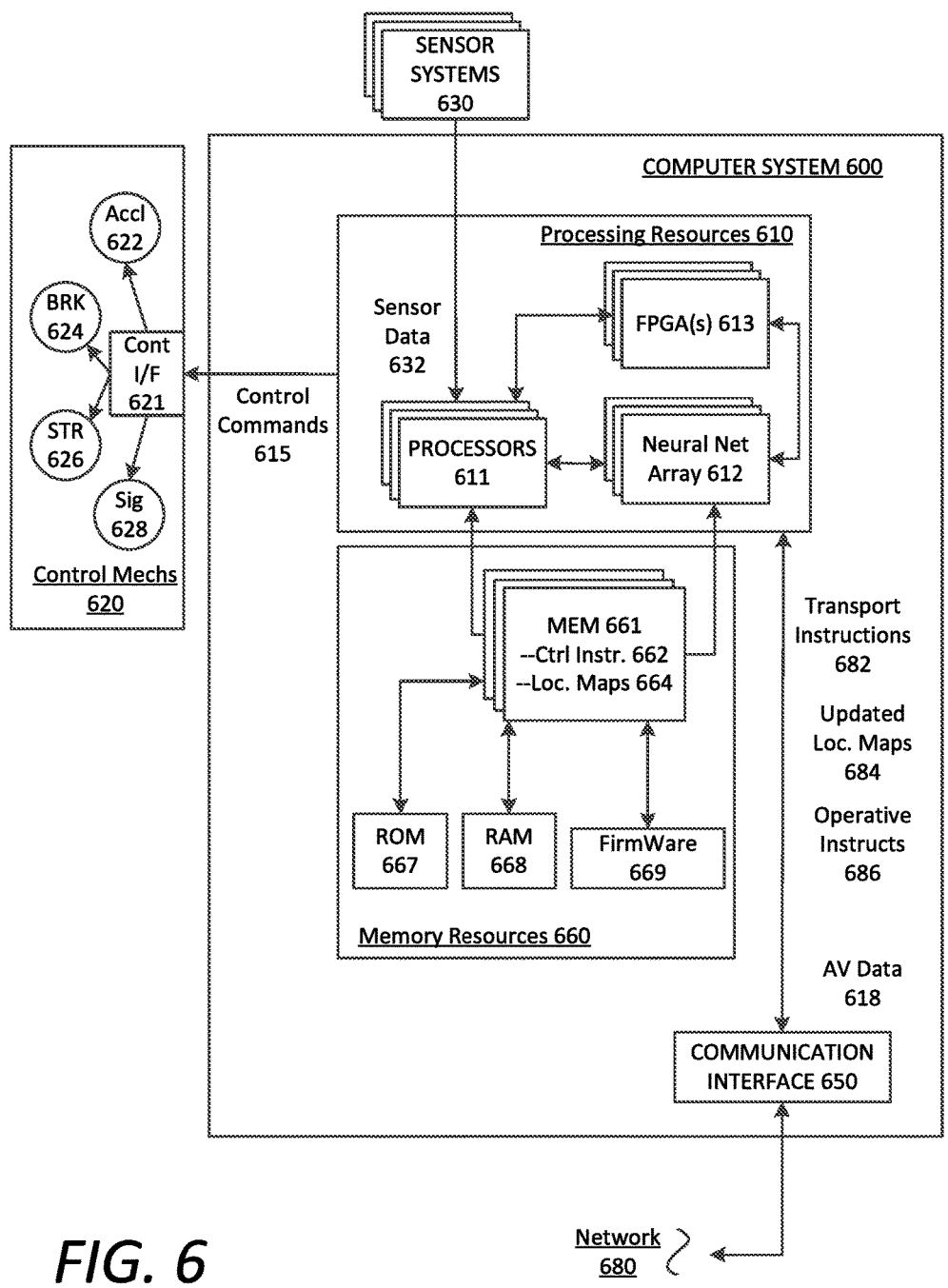
FIG. 6 is a block diagram illustrating a computer system for an autonomous vehicle upon which examples described herein may be implemented.

FIG. 6 is a block diagram illustrating a computer system upon which example AV processing systems described herein may be implemented. The computer system 600 can be implemented using a number of processing resources 610, which can comprise processors 611, field programmable gate arrays (FPGAs) 613. In some aspects, any number of processors 611 and/or FPGAs 613 of the computer system 600 can be utilized as components of a neural network array 612 implementing a machine learning model and utilizing road network maps stored in memory 661 of the computer system 600. In the context of FIGS. 1 and 2, various aspects and components of the AV control system 220 can be implemented using one or more components of the computer system 600 shown in FIG. 6.

According to some examples, the computer system 600 may be implemented within an autonomous vehicle (AV) with software and hardware resources such as described with examples of FIG. 2. In an example shown, the computer system 600 can be distributed spatially into various regions of the AV, with various aspects integrated with other components of the AV itself. For example, the processing resources 610 and/or memory resources 660 can be provided in a cargo space of the AV. The various processing resources 610 of the computer system 600 can also execute control instructions 662 using microprocessors 611, FPGAs 613, a neural network array 612, or any combination of the foregoing.

In an example of FIG. 6, the computer system 600 can include a communication interface 650 that can enable communications over a network 680. In one implementation, the communication interface 650 can also provide a data bus or other local links to electro-mechanical interfaces of the vehicle, such as wireless or wired links to and from control mechanisms 620 (e.g., via a control interface 621), sensor systems 630, and can further provide a network link to a backend transport management system or a remote teleassistance system (implemented on one or more datacenters) over one or more networks 680.

The memory resources 660 can include, for example, main memory 661, a read-only memory (ROM) 667, storage device, and cache resources. The main memory 661 of memory resources 660 can include random access memory (RAM) 668 or other dynamic storage device, for storing information and instructions which are executable by the processing resources 610 of the computer system 600. The processing resources 610 can execute instructions for processing information stored with the main memory 661 of the memory resources 660. The main memory 661 can also store temporary variables or other intermediate information which can be used during execution of instructions by the processing resources 610. The memory resources 660 can also include ROM 667 or other static storage device for storing static information and instructions for the processing resources 610. The memory resources 660 can also include other forms of memory devices and components, such as a magnetic disk or optical disk, for purpose of storing information and instructions for use by the processing resources 610. The computer system 600 can further be implemented using any combination of volatile and/or non-volatile memory, such as flash memory, PROM, EPROM, EEPROM (e.g., storing firmware 669), DRAM, cache resources, hard disk drives, and/or solid state drives.

The memory 661 may also store localization maps 664 in which the processing resources 610—executing control instructions 662—continuously compare to sensor data 632 from the various sensor systems 630 of the AV. Execution of the control instructions 662 can cause the processing resources 610 to generate control commands 615 in order to autonomously operate the AV's acceleration 622, braking 624, steering 626, and signaling systems 628 (collectively, the control mechanisms 620). Thus, in executing the control instructions 662, the processing resources 610 can receive sensor data 632 from the sensor systems 630, dynamically compare the sensor data 632 to a current localization map 664, and generate control commands 615 for operative control over the acceleration, steering, and braking of the AV along a particular route plan based on transport instructions 682 received from an on-demand transportation facilitation system over the network 680. The processing resources 610 may then transmit the control commands 615 to one or more control interfaces 621 of the control mechanisms 620 to autonomously operate the AV along an autonomy route indicated in the transport instructions 682, as described throughout the present disclosure.

Furthermore, as described herein, the computer system 600 may receive updated localization maps 684 or operative instructions 686 from the on-demand transport system over the network 680 to resolve local anomalies throughout the given region.

Figure 7:
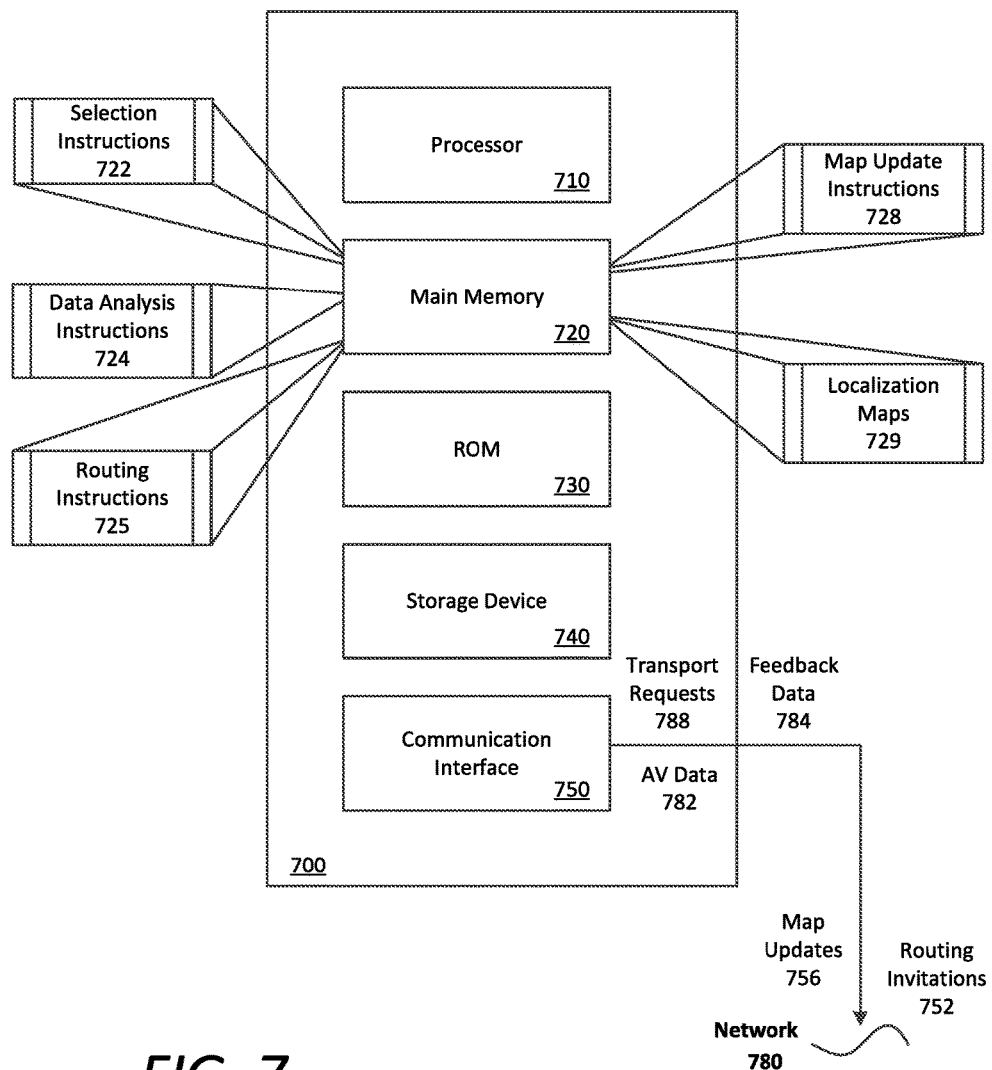
FIG. 7 is a block diagram illustrating a computer system for a backend datacenter upon which example on-demand transport systems described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service for providing transportation services. In the context of FIGS. 1 and 2, the on-demand transport facilitation system 100, 290, 390 may be implemented using a computer system 700 such as described by FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate over one or more networks 780 (e.g., cellular network) through use of the network link (wireless or wired). Using the network link, the computer system 700 can communicate with one or more computing devices, one or more servers, and/or one or more autonomous vehicles. The executable instructions stored in the memory 720 can include selection instructions 722, which enable the computer system 700 to receive locations of AVs and human drivers operating throughout the given region, and select AVs and human drivers to service a transport request 788 received from requesting users. The executable instructions can further include data analysis instructions 724, which enables the computer system 700 to process AV data 782 received from AVs operating throughout the given region to identify and/or predict local anomalies.

The instructions can further include routing instructions 725, which enable the computer system 700 to select drivers to assist in resolving local anomalies, and transmitting routing invitations 752 to the selected drivers to assess the local anomalies and provide feedback data 784, such as status responses or recorded sensor data. The instructions can further include map update instructions 728 which enable the computer system 700 to utilize recorded sensor data from the drivers to update stale localization maps 729, and thereafter distribute refreshed localization map updates 756 to the AVs.

The processor 710 is configured with software and/or other logic to perform one or more processes, steps and other functions described with implementations, such as described with respect to FIGS. 1-6, and elsewhere in the present application. Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. An on-demand transport facilitation system comprising:
    one or more processors;
    one or more memory resources storing instructions that, when executed by the one or more processors, cause the one or more processors to:
        manage an on-demand transportation service for a given region by matching requesting users with drivers and autonomous vehicles (AVs), the AVs utilizing localization maps and live sensor data to autonomously operate throughout the given region;
        identify a local anomaly within the given region, the local anomaly affecting AV performance;
        transmit a routing invitation to one or more of the drivers, via an executing driver application on a computing device of each of the one or more drivers, to provide feedback corresponding to the local anomaly;
        receive an acceptance to the routing invitation from a selected driver of the one or more drivers;
        receive feedback data from the selected driver to resolve the local anomaly; and
        based on the feedback data, transmit an update to AVs intersecting the local anomaly to enable the intersecting AVs to resolve the local anomaly.

2. The on-demand transport facilitation system of claim 1, wherein the feedback data comprises recorded sensor data from the selected driver, and wherein the executed instructions further cause the one or more processors to:
    determine, from the recorded sensor data, that a localization map corresponding to the local anomaly comprises stale data; and
    update the localization map with the recorded sensor data;
    wherein the update transmitted to the intersecting AVs comprises the updated localization map.

3. The on-demand transport facilitation system of claim 2, wherein the executed instructions cause the one or more processors to update the localization map by extracting new data from the recorded sensor data and patching the stale data of the localization map with the new data.

4. The on-demand transport facilitation system of claim 3, wherein the new data comprises a new static object.

5. The on-demand transport facilitation system of claim 2, wherein the stale data in the localization map corresponds to at least one of a road construction zone, a road hazard, or an occlusion.

6. The on-demand transport facilitation system of claim 1, wherein the executed instructions further cause the one or more processors to:
    receive telemetry data from the AVs operating throughout the given region, the telemetry data indicating the local anomaly.

7. The on-demand transport facilitation system of claim 1, wherein the executed instructions further cause the one or more processors to:
receive teleassistance requests from AVs encountering the local anomaly, the teleassistance requests indicating stuck states for the encountering AVs due to the local anomaly;
wherein the executed instructions cause the one or more processors to identify the local anomaly based on the received teleassistance requests.

8. The on-demand transport facilitation system of claim 1, wherein the executed instructions further cause the one or more processors to:
store a driver profile for each of the drivers, the driver profile indicating sensor resources possessed by the driver.

9. The on-demand transport facilitation system of claim 8, wherein the executed instructions cause the on-demand transport facilitation system to transmit the routing invitation to the one or more drivers based on (i) at least one of distance or time from a current location of each of the one or more drivers to local anomaly, and (ii) the sensor resources of each of the one or more drivers as indicating by the driver profiles.

10. The on-demand transport facilitation system of claim 8, wherein the sensor resources included in each of the driver profiles indicates whether a corresponding driver possesses sensor data recording equipment comprising at least one of a LIDAR sensor or a stereoscopic camera.

11. The on-demand transport facilitation system of claim 1, wherein the executed instructions further cause the one or more processors to:
transmit a status query to the selected driver, the status query to determine whether a road segment corresponding to the local anomaly is passable;
wherein the received feedback data comprises a query response from the driver indicating whether the road segment is passable.

12. The on-demand transport facilitation system of claim 1, wherein the executed instructions further cause the one or more processors to:
access a third party resource indicating planned road projects for the given region;
wherein the executed instructions cause the one or more processors to identify the local anomaly based on the planned road projects for the given region.

13. A non-transitory computer readable medium storing instructions that, when executed by one or more processors, cause the one or more processors to:
manage an on-demand transportation service for a given region by matching requesting users with drivers and autonomous vehicles (AVs), the AVs utilizing localization maps and live sensor data to autonomously operate throughout the given region;
identify a local anomaly within the given region, the local anomaly affecting AV performance;
transmit a routing invitation to one or more of the drivers, via an executing driver application on a computing device of each the one or more drivers, to provide feedback corresponding to the local anomaly;
receive an acceptance to the routing invitation from a selected driver of the one or more drivers;
receive feedback data from the selected driver to resolve the local anomaly; and
based on the feedback data, transmit an update to AVs intersecting the local anomaly to enable the intersecting AVs to resolve the local anomaly.

14. The non-transitory computer readable medium of claim 13, wherein the feedback data comprises recorded sensor data from the selected driver, wherein the executed instructions further cause the one or more processors to:
determine, from the recorded sensor data, that a localization map corresponding to the local anomaly comprises stale data; and
update the localization map with the recorded sensor data; and
wherein the update transmitted to the intersecting AVs comprises the updated localization map.

15. The non-transitory computer readable medium of claim 14, wherein the executed instructions cause the one or more processors to update the localization map by extracting new data from the recorded sensor data and patching the stale data of the localization map with the new data.

16. The non-transitory computer readable medium of claim 15, wherein the new data comprises a new static object.

17. The non-transitory computer readable medium of claim 14, wherein the stale data in the localization map corresponds to at least one of a road construction zone, a road hazard, or an occlusion.

18. A computer-implemented method of facilitating transportation by autonomous vehicles (AVs), the method being performed by one or more processors and comprising:
managing an on-demand transportation service for a given region by matching requesting users with drivers and the AVs, the AVs utilizing localization maps and live sensor data to autonomously operate throughout the given region;
identifying a local anomaly within the given region, the local anomaly affecting AV performance;
transmitting a routing invitation to one or more of the drivers, via an executing driver application on a computing device of each of the one or more drivers, to provide feedback corresponding to the local anomaly;
receiving an acceptance to the routing invitation from a selected driver of the one or more drivers;
receiving feedback data from the selected driver to resolve the local anomaly; and
based on the feedback data, transmitting an update to AVs intersecting the local anomaly to enable the intersecting AVs to resolve the local anomaly.

19. The method of claim 18, wherein the feedback data comprises recorded sensor data from the selected driver, the method further comprising:
determining, from the recorded sensor data, that a localization map corresponding to the local anomaly comprises stale data; and
updating the localization map with the recorded sensor data; and
wherein the update transmitted to the intersecting AVs comprises the updated localization map.

20. The method of claim 19, wherein updating the localization map comprises extracting new data from the recorded sensor data and patching the stale data of the localization map with the new data.

* * * * *